US012638233B2

(12) United States Patent
Plays

(10) Patent No.: US 12,638,233 B2
(45) Date of Patent: May 26, 2026

(54) INSTALLATION AND METHOD FOR LIQUEFYING HYDROGEN

(71) Applicant: L'Air Liquide, Societe Anonyme pour l'Etude et l'Exploitation des Procedes Georges Claude, Paris (FR)

(72) Inventor: Thibault Plays, Jouy-en-Josas (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 274 days.

(21) Appl. No.: 18/216,150

(22) Filed: Jun. 29, 2023

(65) Prior Publication Data

US 2024/0003617 A1 Jan. 4, 2024

(30) Foreign Application Priority Data

Jun. 29, 2022 (FR) ...................................... 2206509

(51) Int. Cl.
*F25J 1/00* (2006.01)
*C01B 3/00* (2026.01)
(Continued)

(52) U.S. Cl.
CPC ............. *F25J 1/001* (2013.01); *C01B 3/0089* (2013.01); *F25J 1/0264* (2013.01);
(Continued)

(58) Field of Classification Search
CPC ........ F25J 1/001; F25J 1/0264; F25J 2205/82; F25J 2215/02; F25J 2245/02;
(Continued)

(56) References Cited

U.S. PATENT DOCUMENTS 2,937,076 A 5/1960 Class et al.
3,992,167 A * 11/1976 Beddome ................. F25J 1/025
505/895
(Continued)

FOREIGN PATENT DOCUMENTS

CN 108036582 A * 5/2018
CN 109059419 B * 7/2020 ............. F25J 1/0205
(Continued)

OTHER PUBLICATIONS

French Search Report for FR 2 206 509, mailed Feb. 2, 2023.

*Primary Examiner* — Jianying C Atkisson
*Assistant Examiner* — Ibrahim A. Michael Adeniji
(74) *Attorney, Agent, or Firm* — Justin K. Murray

(57) ABSTRACT

The invention relates to an installation for liquefying hydrogen, comprising a circuit for hydrogen to be cooled, a set of heat exchanger(s) in heat exchange with the circuit, a cooling system comprising a refrigerator with a cycle of refrigeration of a first cycle gas comprising helium and/or hydrogen, the circuit comprising at least one catalysis section so as to ensure conversion of the ortho-hydrogen into para-hydrogen, the circuit further comprising a first bypass portion bypassing at least one catalysis section, the downstream end of the circuit comprising two parallel branches that are not combined and are supplied respectively with the hydrogen that has passed through the first bypass portion and hydrogen that has passed through the catalysis section so as to provide two distinct hydrogen streams that have different relative proportions of ortho-hydrogen and para-hydrogen.

15 Claims, 3 Drawing Sheets

(51) Int. Cl.
    *C01B 3/0089*     (2026.01)
    *F25J 1/02*       (2006.01)

(52) U.S. Cl.
    CPC ........ *F25J 2205/82* (2013.01); *F25J 2215/02* (2013.01); *F25J 2245/02* (2013.01); *F25J 2290/50* (2013.01); *Y02E 60/32* (2013.01)

(58) Field of Classification Search
    CPC ...... F25J 2290/50; F25J 1/0205; F25J 1/0214; F25J 2210/06; F25J 1/005; F25J 1/0062; F25J 1/0065; F25J 1/0067; F25J 1/0215; F25J 1/0245; F25J 1/0255; C01B 3/0089; Y02E 60/32
    See application file for complete search history.

(56)              References Cited

U.S. PATENT DOCUMENTS

| | | | |
|---|---|---|---|
| 7,040,119 | B2 | 5/2006 | Bracha et al. |
| 9,714,168 | B1 * | 7/2017 | White ...................... B01J 37/04 |
| 2004/0112083 | A1 * | 6/2004 | Bracha .................... F25J 1/001 |
| | | | 62/611 |
| 2021/0199244 | A1 * | 7/2021 | Fairy ......................... F17C 9/02 |
| 2021/0381756 | A1 * | 12/2021 | Decker .................. F25J 1/0221 |
| 2024/0125547 | A1 * | 4/2024 | Barjhoux ............... F25J 1/0072 |
| 2024/0384926 | A1 * | 11/2024 | Gaertner ................. F25J 1/001 |

FOREIGN PATENT DOCUMENTS

| | | | |
|---|---|---|---|
| CN | 114 061 264 | 2/2022 | |
| DE | 101 06 483 | 8/2002 | |
| JP | 3486786 B2 * | 1/2004 | .............. F25J 1/001 |
| WO | WO 2002/065037 | 8/2002 | |

\* cited by examiner

[Fig. 1]
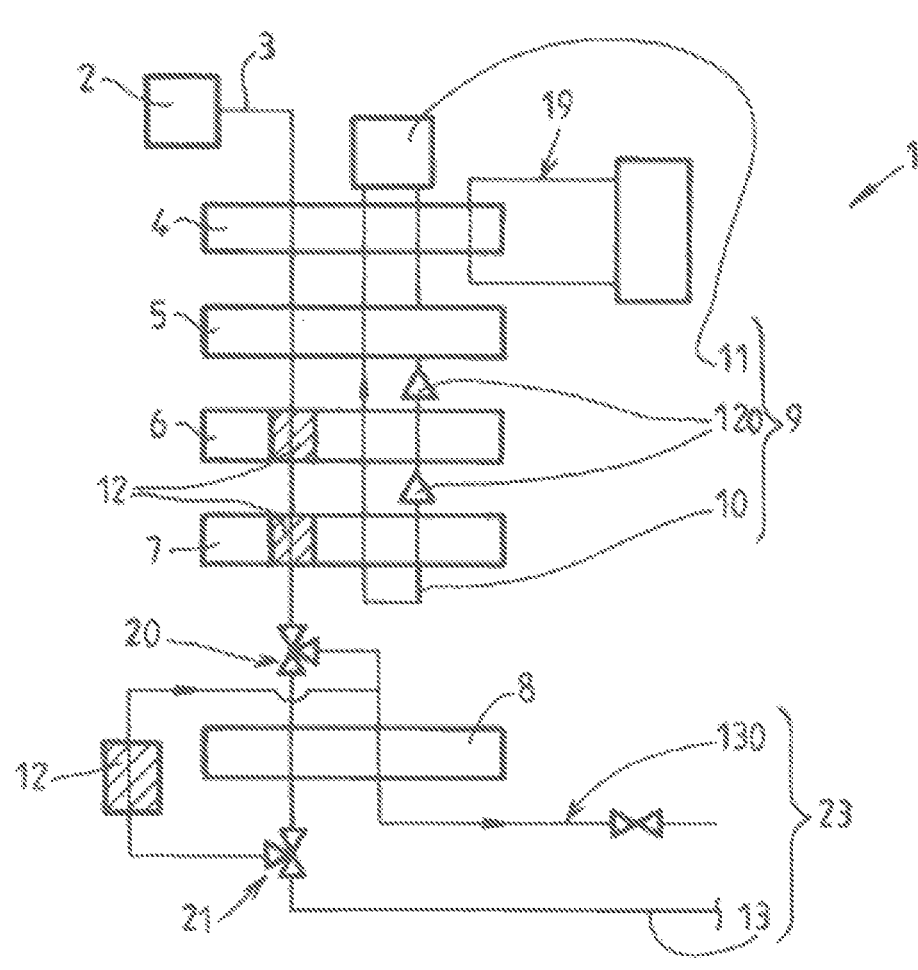

[Fig. 2]
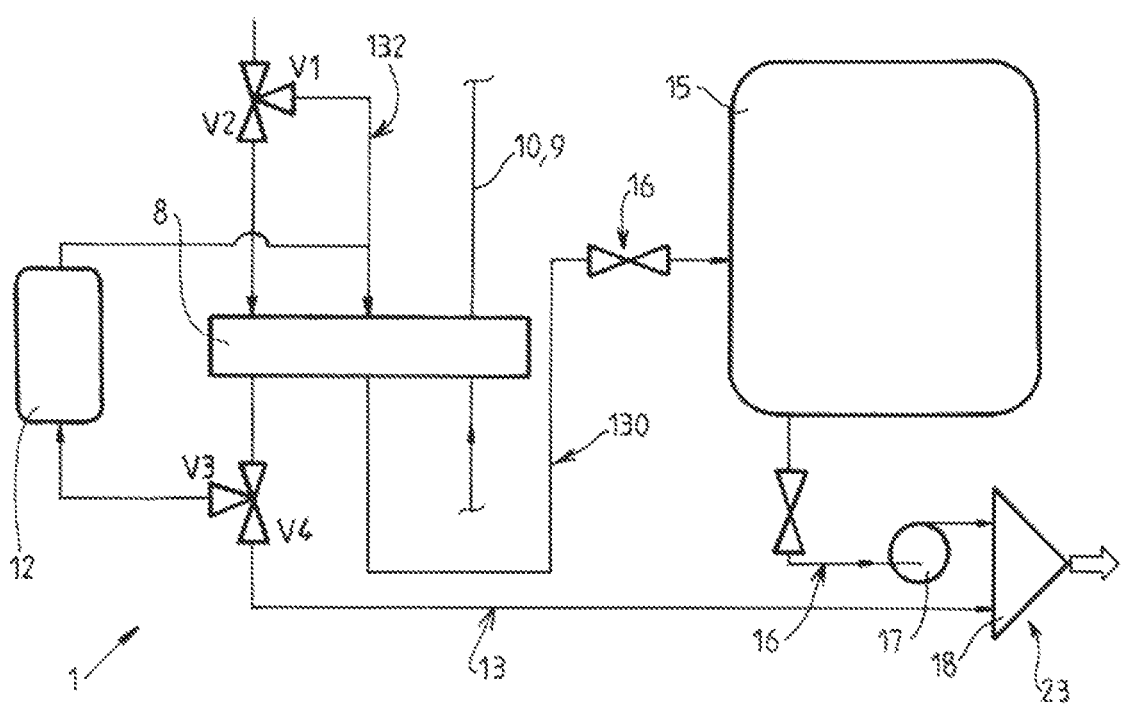

[Fig. 3]
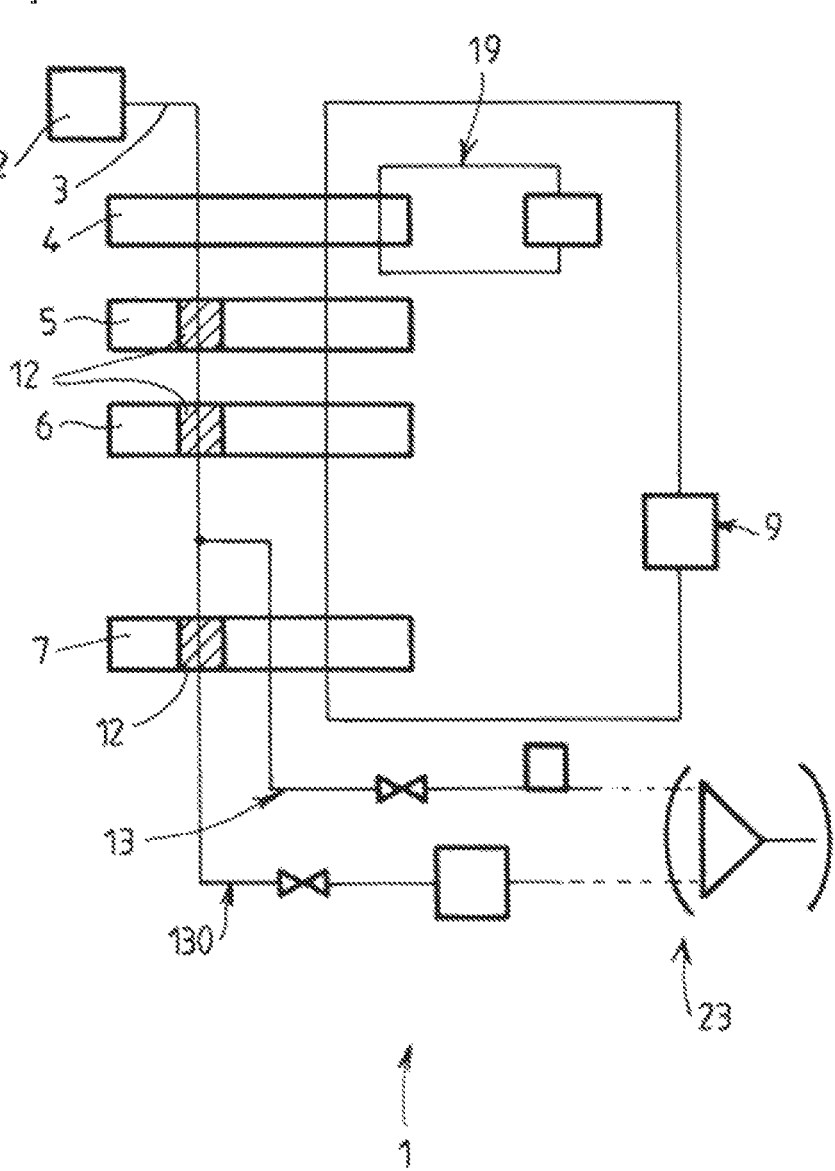

INSTALLATION AND METHOD FOR LIQUEFYING HYDROGEN

CROSS REFERENCE TO RELATED APPLICATIONS

This application claims the benefit of priority under 35 U.S.C. § 119 (a) and (b) to French patent application No. FR2206509, filed Jun. 29, 2022, the entire contents of which are incorporated herein by reference.

FIELD OF THE INVENTION

The invention relates to an installation and a method for liquefying hydrogen.

BACKGROUND OF THE INVENTION

Hydrogen has two isomers that differ in the combination of the spins of each hydrogen atom making up the molecule. The ortho-hydrogen (ortho) form has parallel spins while the para-hydrogen (para) form has antiparallel spins.

The proportion at equilibrium of these two isomers depends on the temperature.

Thus, at ambient temperature, the hydrogen is made up of 75% ortho-hydrogen and 25% para-hydrogen, while at the temperature of the liquid hydrogen (+/–20 K), equilibrium is reached close to 100% para-hydrogen. Conversion from the ortho form to the para form is exothermic. The energy released by this conversion reaction (700 J/g at 20K) is greater than the vaporisation energy (450 J/g)). By contrast, the kinetics of this reaction are rather slow in the absence of catalyst. Thus, if catalyst is not used during its liquefaction, the hydrogen at the outlet of the liquefier will be very far from its equilibrium. Conversion will therefore take place in the store, and during transport. In order to avoid this introduction of heat in the liquid hydrogen tanks generating partial vaporisation of liquid hydrogen, the conversion of the ortho isomer into para isomer is catalysed in the liquefaction method in order to approach the concentration at equilibrium.

This ortho-para conversion is very expensive in terms of energy since it is necessary to absorb the release of heat of the reaction at low temperatures (below liquid nitrogen 77 K to 20 K). Now, producing cold at these temperatures requires significant energy consumption.

Regulations for transporting hydrogen may impose a determined content (for example 95%) of para-hydrogen. In order to ensure this value, dimensioning margins are generally taken resulting in a para-hydrogen content at the outlet of close to 100%.

Several schemes for methods exist for liquefaction, in particular following the use of various refrigeration loops (hydrogen, helium, mixture of refrigerants etc.). All these methods use catalyst as far as the cold end of the method. Either through catalytic converters between each exchanger of the method, or by installing the catalyst in the exchangers.

As a function of the lifetime of the liquid hydrogen (tank of the liquefier+transport+customer tank) there is an optimum para-hydrogen concentration at the outlet of the liquefier.

Specifically, the heat given off by the natural conversion of the hydrogen during its residence time may be calculated in order to obtain the energy or material losses linked to the ortho/para conversion.

Document WO02065037A1 describes an installation that makes it possible to vary the ortho/para content at the outlet of the liquefier. This installation provides a hydrogen stream obtained by mixing two streams that have undergone different catalyses. One hydrogen stream bypasses a catalysis section and is mixed back in with the main stream.

This structure is unsuitable for the provision of a stream to a transport pipe. In particular, the solution described does not make it possible to supply receiving members with streams under different conditions (temperature, pressure or para-hydrogen content).

An aim of the present invention is to overcome all or some of the disadvantages of the prior art identified above.

SUMMARY OF THE INVENTION

Certain embodiments of the invention relate to an installation for liquefying hydrogen, comprising a circuit for hydrogen to be cooled having an upstream end intended to be connected to a source of gaseous hydrogen and a downstream end intended to be connected to at least one member for collecting the liquefied hydrogen, the installation comprising a set of heat exchanger(s) in heat exchange with the circuit for hydrogen to be cooled, the device comprising a cooling system in heat exchange with at least part of the set of heat exchanger(s) and configured to lower the temperature of the hydrogen to a determined temperature, for example of between 15 and 25 K, the cooling system comprising a refrigerator with a cycle of refrigeration of a first cycle gas comprising helium and/or hydrogen, the circuit for hydrogen to be cooled comprising at least one catalysis section configured to ensure conversion of the ortho-hydrogen into para-hydrogen, the circuit for hydrogen to be cooled further comprising a first bypass portion bypassing at least one catalysis section configured to make it possible to control the relative proportions of ortho-hydrogen and para-hydrogen that are obtained at the downstream end.

In the installation according to at least one embodiment of the invention, the downstream end of the circuit for hydrogen to be cooled may include two parallel branches that are not combined and are supplied respectively with the hydrogen that has passed through the first bypass portion and hydrogen that has passed through the catalysis section so as to provide two distinct hydrogen streams that have different relative proportions of ortho-hydrogen and para-hydrogen to one or more collection members.

Furthermore, embodiments of the invention may have one or more of the following features:

the branch of the downstream end of the circuit for hydrogen to be cooled that is supplied with the hydrogen that has passed through the catalysis section comprises a member for expanding the hydrogen stream, for example an expansion valve, and a buffer store for the expanded hydrogen, the expansion member and/or the buffer store are configured to store the liquefied hydrogen in the buffer store at a determined pressure, for example of between 1 and 2 bar, the buffer store comprises a withdrawal duct provided with a pump, the branch of the downstream end of the circuit for hydrogen to be cooled that is supplied with the hydrogen that has passed through the bypass portion is configured to provide a hydrogen stream at a pressure higher than the pressure of the hydrogen in the other branch, and for example a pressure of between 10 and 25 bar, the downstream ends of the two parallel branches are connected to one and the same fluidic connector or manifold, the installation comprises a plurality of catalysis sections disposed in series from upstream to downstream on the circuit for hydrogen to be cooled and configured to ensure ortho-para conversion of the hydrogen; the first bypass portion is configured to bypass the last downstream catalysis section, the branch of the circuit for fluid to be cooled passing through the catalysis section is configured to cool the hydrogen with a cooling heat exchanger before passing through the catalysis section and then to exchange again with this same exchanger after passing through the catalysis section, and the circuit for hydrogen to be cooled comprises a second bypass branch configured to bypass the catalysis section, the second bypass branch being connected downstream to the branch supplied with the hydrogen that has passed through the catalysis section.

Certain embodiments of the invention may also relate to a method for liquefying hydrogen using a liquefaction installation comprising a circuit for hydrogen to be cooled having an upstream end intended to be connected to a source of gaseous fluid and a downstream end intended to be connected to a member for collecting the liquefied hydrogen, the installation comprising a set of heat exchanger(s) in heat exchange with the circuit for hydrogen to be cooled, the device comprising a cooling system in heat exchange with at least part of the set of heat exchanger(s) and configured to lower the temperature of the hydrogen to a determined temperature, for example of between 15 and 25 K, the cooling system comprising a refrigerator with a cycle of refrigeration of a first cycle gas comprising helium and/or hydrogen, the circuit for hydrogen to be cooled comprising at least one catalysis section configured to ensure ortho-para conversion of the hydrogen, the circuit for hydrogen to be cooled further comprising a first bypass portion bypassing at least one catalysis section configured to make it possible to control the relative proportions of ortho-hydrogen and para-hydrogen that are obtained at the downstream end, the downstream end of the circuit for hydrogen to be cooled comprising two parallel branches that are supplied respectively with the hydrogen that has passed through the first bypass portion and hydrogen that has passed through the catalysis section, so as to provide two distinct hydrogen streams that have different relative proportions of ortho-hydrogen and para-hydrogen to one or more collection members, the method comprising a step of producing and storing liquefied hydrogen with a relatively higher proportion of para-hydrogen, for example greater than 95%, and a step of producing and providing liquefied hydrogen with a relatively lower proportion of para-hydrogen, for example of between 50 and 90%.

According to other possible particular features:

during the step of producing and providing liquefied hydrogen with a relatively lower proportion of para-hydrogen, the liquefied hydrogen is provided to a pipe for transporting and distributing liquefied hydrogen, and during the step of producing and providing liquefied hydrogen with a relatively lower proportion of para-hydrogen, a fraction of liquefied hydrogen with a relatively higher proportion of para-hydrogen is mixed with the liquefied hydrogen having a relatively lower proportion of para-hydrogen.

The invention may also relate to any alternative device or method comprising any combination of the features above or below within the scope of the claims.

Further particular features and advantages will become apparent upon reading the following description, which is provided with reference to the figures, in which:

BRIEF DESCRIPTION OF THE DRAWINGS

Other features and advantages of the invention will become further apparent via, on the one hand, the following description and, on the other hand, several exemplary embodiments given by way of non-limiting indication and with reference to the attached schematic drawings, in which:

FIG. 1 is a schematic and partial view illustrating an example of the structure and operation of an installation according to one embodiment of the invention, FIG. 2 is a schematic and partial view illustrating a detail of a variant embodiment of an installation according to the invention, FIG. 3 is a schematic and partial view illustrating an example of the structure and operation of an installation according to another embodiment of the invention.

DETAILED DESCRIPTION OF THE INVENTION

Throughout the figures, the same references relate to the same elements.

In this detailed description, the following embodiments are examples. Although the description refers to one or more embodiments, this does not mean that the features apply only to a single embodiment. Individual features of different embodiments can also be combined and/or interchanged to provide other embodiments.

The installation 1 for liquefying hydrogen illustrated comprises a circuit 3 for fluid to be cooled having an upstream end intended to be connected to a source 2 of gaseous hydrogen (for example a gas network, an electrolyser, or any other hydrogen production unit) and a downstream end 23 intended to be connected to at least one member for collecting the liquefied fluid (for example one or more cryogenic stores).

The device 1 comprises a set of heat exchanger(s) 4, 5, 6, 7, 8 in heat exchange with the circuit 3 for fluid to be cooled.

The device 1 comprises a cooling system 9 (cryogenic refrigerator) in heat exchange with at least part of the set of heat exchanger(s) and configured to lower the temperature of the fluid to be cooled to a determined temperature, for example of between 15 and 25 K.

As schematically shown, the cooling system 9 preferably comprises a refrigerator with a cycle of refrigeration of a first cycle gas comprising helium and/or hydrogen.

This refrigerator comprises, for example, disposed in series in a cycle circuit 10: a mechanism 11 for compressing the cycle gas, at least one member 4, 5, 6, 7 for cooling the cycle gas, a mechanism 12 for expanding the cycle gas (comprising one or more turbines and/or expansion valves) and at least one member 7, 6, 5, 4 for heating the expanded cycle gas. The compression mechanism preferably comprises a plurality of compression stages in series made up of a set of centrifugal and/or piston compressor(s). The expansion mechanism comprises for example one or more expansion stages made up of a set of centripetal turbine(s) 120.

As illustrated, the installation 1 may comprise a precooling system 19 (cryogenic refrigerator or equivalent) in heat exchange with at least part of the set of heat exchanger (s) and configured to lower the temperature of the hydrogen to be cooled from ambient temperature to a determined temperature, for example of between 60 and 90 K.

As illustrated, the circuit 3 for fluid to be cooled comprises at least one catalysis section 12 configured to ensure conversion of the ortho-hydrogen into para-hydrogen. As illustrated, a plurality of catalysis sections 12 may be provided in series on the circuit 3 for fluid to be cooled, for example at the passages in the heat exchangers 6, 7.

Preferably, at the last catalysis section 12, the circuit 3 for fluid to be cooled comprises a first bypass portion 13 bypassing this catalysis section 12. This first bypass portion 13 is configured to make it possible to control the relative proportions of ortho-hydrogen and para-hydrogen that are obtained at the downstream end 23.

Thus, the downstream end 23 of the circuit 3 for fluid to be cooled comprises two parallel branches 13, 130 that are not combined and are supplied respectively with the hydrogen that has passed through the first bypass portion 13 and hydrogen that has passed through the last catalysis section 12. These two branches or ducts provide two distinct hydrogen streams that have different relative proportions of ortho-hydrogen and para-hydrogen (to one or more collection members).

In particular, the stream that has passed through the bypass portion 13 may retain a relatively high pressure (for example around 20 bar) so as to be sent directly into a liquefied hydrogen distribution network duct. This hydrogen that is relatively more para-hydrogen lean may in particular be used during filling of a tank of a vehicle (an aeroplane or other mobility means using liquid hydrogen as fuel).

This makes it possible to reduce the consumption of a pump that would be used since the hydrogen is already at a relatively high pressure. In addition, this makes it possible to provide hydrogen that is less expensive to produce for applications that do not require a high proportion of para-hydrogen. If appropriate, the liquid hydrogen transport duct may be kept cold with this relatively less expensive liquid hydrogen.

Thus, the cooled hydrogen stream is split (preferably in an adjustable manner) into two from a certain stage of the cooling/liquefaction process One part is subjected to the last catalysis (so as to reach for example a para-hydrogen concentration greater than 95%) and the other part is not (so as to retain a para-hydrogen concentration of between 50 and 90% for example).

These para-hydrogen contents may be adapted according to the needs of and the use by the user who receives the liquid hydrogen (for example according to a calculation of the lifetime of the liquefied hydrogen before it is used).

This bypass bypassing the catalysis section 12 is for example situated at the circuit 3 where the hydrogen approaches the temperature of 40 K.

As illustrated in [FIG. 2], the branch 130 of the downstream end 23 of the circuit 3 for fluid to be cooled that is supplied with the hydrogen that has passed through the catalysis section 12 may comprise a member 14 for expanding the hydrogen stream, for example an expansion valve, and a buffer store 15 for the expanded hydrogen.

The expansion member 14 and/or the buffer store 15 are configured to store hydrogen in the buffer store 15 at a determined pressure, for example of between 1 and 2 bar.

The buffer store 15 preferably comprises a withdrawal duct 16 optionally provided with a pump 17 so as to produce liquid hydrogen at relatively low pressure and with a relatively high proportion of para-hydrogen.

The branch 13 of the downstream end 23 of the circuit 3 for fluid to be cooled that is supplied with the hydrogen that has passed through the bypass portion is configured to provide a hydrogen stream at a pressure higher than that of the pressure of the hydrogen in the other branch 130, and for example a pressure of between 10 and 25 bar.

As illustrated, the downstream ends of the two parallel branches 13, 130 may be connected to one and the same fluidic connector 18 or manifold.

As illustrated, the branch 130 of the circuit 3 for fluid to be cooled passing through the catalysis section 12 may be configured to exchange heat with a cooling heat exchanger 8 before passing through the catalysis section 12 and then to exchange again with this same exchanger 8 after passing through the catalysis section 12. This heat exchanger 8 can be one (and in particular the last downstream one) of the set of exchangers mentioned above.

In addition, the circuit 3 for fluid to be cooled may comprise a second bypass branch 132 configured to bypass the catalysis section 12, this second bypass branch 132 being connected downstream to the branch 130 supplied with the hydrogen that has passed through the catalysis section 12 (cf. [FIG. 2]).

As illustrated, the control of the hydrogen streams in the circuit 3 and in particular in a bypass portion may be commanded by a set of one or more valves, for example three-way valves.

Thus, after the outlet of a heat exchanger 7 (cooling for example to a temperature of 20 K), the circuit 3 may have a first three-way valve 20 that makes it possible to separate the flow into two streams. A second three-way valve 21 is disposed downstream of the last exchanger 8. By opening a passage V3 of the second three-way valve 21 towards the catalysis section 12, it is possible to make a flow of hydrogen pass through the catalysis section 12 (typically a catalytic converter converting hydrogen until a content of 98% para-hydrogen for example is reached). This catalysed flow then passes back into the heat exchanger 8 in order to be cooled (so as to compensate for the heat given off by the conversion).

When the port V3 of the second valve 21 is closed or slightly open, it is possible to use the three-way valve 20 positioned upstream of the heat exchanger 8 to permanently maintain a flow in all of the passages of the heat exchanger 8.

By acting on the opening of the ports V3 and V4, it is possible to control the ratio of the flow rate passing through the catalysis section 12 and thus control the final para-hydrogen content. By closing the port V3 and opening the port V4, the lower content of para-hydrogen, for example 89%, will be retained. By closing the port V4 and opening the port V3, a higher content, for example close to 98%, will be obtained. All the intermediate values are possible by adjusting the ratio of the flow rates.

When a customer orders liquid hydrogen, it is conceivable to request from them the intended residence time for the hydrogen. Depending on this variable, an estimation of the vaporisation by the ortho/para conversion as a function of the initial content of para-hydrogen may be made. By varying the para-hydrogen content, an optimum in the gain/loss balance will be reached. It is then sufficient to calculate the flow rate ratio necessary to obtain this degree of conversion.

Of course, the invention is not limited to the examples above. In particular, it is also possible to provide a buffer tank on the branch 13 that supplies hydrogen having relatively less para-hydrogen. This tank is preferably pressurized (15 to 25 bar, for example).

The variant in [FIG. 3] differs from that of [FIG. 1] in that the branch 130 that passes through the catalysis section 12 (and not through the first bypass portion) passes through a catalysis section 12 integrated in the heat exchanger 7. The stream in this branch 130 passes through this downstream exchanger 7 only once. Each of the two branches 13, 130 may have a valve. These two branches provide streams at different ortho/para concentrations and pressures. The other identical elements are denoted by the same references and are not described a second time.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

The invention claimed is:

1. An installation for liquefying hydrogen, the installation comprising:
   a circuit configured to cool hydrogen having an upstream end configured to be connected to a source of gaseous hydrogen and a downstream end configured to be connected to at least one member for collecting the liquefied hydrogen;
   a set of heat exchanger(s) in heat exchange with the circuit; and
   a cooling system in heat exchange with at least part of the set of heat exchanger(s) and configured to lower the temperature of the hydrogen to a determined temperature,
   wherein the cooling system comprises a refrigerator with a cycle of refrigeration of a first cycle gas comprising helium and/or hydrogen, wherein the circuit comprises at least one catalysis section configured to ensure conversion of the ortho-hydrogen into para-hydrogen,
   wherein the circuit further comprises a first bypass portion bypassing at least one catalysis section configured to control the relative proportions of ortho-hydrogen and para-hydrogen that are obtained at the downstream end,
   wherein the downstream end of the circuit for hydrogen to be cooled comprises two parallel branches that are not combined and are supplied respectively with the hydrogen that has passed through the first bypass portion and hydrogen that has passed through the catalysis section, the two parallel branches closing two separate ends so as to provide two distinct hydrogen streams that have different relative proportions of ortho-hydrogen and para-hydrogen to one or more collection members,
   wherein the downstream ends of the two parallel branches are connected to a single fluidic connector or manifold, wherein the single fluidic connector or manifold is configured to deliver the two distinct hydrogen streams separately such that the two distinct hydrogen streams do not mix within the single fluidic connector or manifold.

2. The installation according to claim 1, wherein the branch of the downstream end of the circuit for hydrogen to be cooled that is supplied with the hydrogen that has passed through the catalysis section comprises an expansion valve configured to expand the hydrogen stream, and a buffer store for the expanded hydrogen.

3. The installation according to claim 2, wherein the expansion valve and/or the buffer store are configured to store the liquefied hydrogen in the buffer store at a determined pressure.

4. The installation according to claim 2, wherein the buffer store comprises a withdrawal duct provided with a pump.

5. The installation according to claim 1, wherein the branch of the downstream end of the circuit for hydrogen to be cooled that is supplied with the hydrogen that has passed through the bypass portion is configured to provide a hydrogen stream at a pressure higher than the pressure of the hydrogen in the other branch.

6. The installation according to claim 1, wherein it comprises a plurality of catalysis sections disposed in series from upstream to downstream on the circuit and configured to ensure conversion of ortho-hydrogen into para-hydrogen, and in that the first bypass portion is configured to bypass the last downstream catalysis section.

7. The installation according to claim 1, wherein the branch of the circuit passing through the catalysis section is configured to exchange heat with a cooling heat exchanger before passing through the catalysis section and then to exchange again with this same exchanger after passing through the catalysis section.

8. The installation according to claim 7, wherein the circuit comprises a second bypass branch configured to bypass the catalysis section, the second bypass branch being connected at its downstream end to the branch supplied with the hydrogen that has passed through the catalysis section.

9. A method for liquefying hydrogen, the method comprising the steps of:
   providing the installation as claimed in claim 1;
   producing and storing liquefied hydrogen with a relatively higher proportion of para-hydrogen, wherein the relatively higher proportion of para-hydrogen is greater than 95%, using the branch that has passed through the catalysis section; and producing and providing liquefied hydrogen with a relatively lower proportion of para-hydrogen, wherein the relatively lower proportion of para-hydrogen is between 50 and 90%, using the branch that has passed through the first bypass portion.

10. The method according to claim 9, wherein, during the step of producing and providing liquefied hydrogen with a relatively lower proportion of para-hydrogen, the liquefied hydrogen is provided to a pipe for transporting and distributing liquefied hydrogen.

11. The method according to claim 9, wherein, during the step of producing and providing liquefied hydrogen with a relatively lower proportion of para-hydrogen, a fraction of liquefied hydrogen with a relatively higher proportion of para-hydrogen is mixed with the liquefied hydrogen having a relatively lower proportion of para-hydrogen.

12. The method according to claim 9, wherein the first bypass portion is located on the circuit at a point where the hydrogen has been cooled to a temperature of approximately 40 K.

13. The method according to claim 9, wherein the step of producing and providing liquefied hydrogen with a relatively lower proportion of para-hydrogen comprises delivering said hydrogen to a fuel tank of a vehicle.

14. The method according to claim 9, further comprising the steps of: (a) determining an intended residence time for the liquefied hydrogen before its use; and (b) adjusting a flow rate ratio between the first bypass portion and the catalysis section based on the determined residence time to produce an optimized para-hydrogen content for that residence time.

15. An installation for liquefying hydrogen, the installation comprising:

a circuit configured to cool hydrogen having an upstream end configured to be connected to a source of gaseous hydrogen and a downstream end configured to be connected to at least one member for collecting the liquefied hydrogen;

a set of heat exchanger(s) in heat exchange with the circuit; and a cooling system in heat exchange with at least part of the set of heat exchanger(s) and configured to lower the temperature of the hydrogen to a determined temperature, wherein the cooling system comprises a refrigerator with a cycle of refrigeration of a first cycle gas comprising helium and/or hydrogen, wherein the circuit comprises at least one catalysis section configured to ensure conversion of the ortho-hydrogen into para-hydrogen, wherein the circuit further comprises a first bypass portion bypassing at least one catalysis section configured to control the relative proportions of ortho-hydrogen and para-hydrogen that are obtained at the downstream end, wherein the downstream end of the circuit for hydrogen to be cooled comprises two parallel branches that are not combined and are supplied respectively with the hydrogen that has passed through the first bypass portion and hydrogen that has passed through the catalysis section, the two parallel branches closing two separate ends so as to provide two distinct hydrogen streams that have different relative proportions of ortho hydrogen and para-hydrogen to one or more collection members, wherein the installation further comprises at least one three-way valve configured to control a flow rate ratio between the hydrogen that is supplied to the first bypass portion and the hydrogen that is supplied to the catalysis section.

* * * * *